(12) United States Patent
Sharma

(10) Patent No.: US 10,576,948 B2
(45) Date of Patent: Mar. 3, 2020

(54) AIRCRAFT BRAKING BASED ON REAL TIME RUNWAY CONDITION

(71) Applicant: AIRBUS GROUP INDIA PRIVATE LIMITED, Bangalore (IN)

(72) Inventor: Anurag Sharma, Bangalore (IN)

(73) Assignee: AIRBUS GROUP INDIA PRIVATE LIMITED, Bangalore (IN)

( * ) Notice: Subject to any disclaimer, the term of this patent is extended or adjusted under 35 U.S.C. 154(b) by 126 days.

(21) Appl. No.: 15/369,918

(22) Filed: Dec. 6, 2016

(65) Prior Publication Data
US 2017/0158177 A1 Jun. 8, 2017

(30) Foreign Application Priority Data

Dec. 8, 2015 (IN) .......................... 6570/CHE/2015

(51) Int. Cl.
| | |
|---|---|
| *B60T 8/17* | (2006.01) |
| *B64C 25/42* | (2006.01) |
| *B60T 8/172* | (2006.01) |

(52) U.S. Cl.
CPC ............ *B60T 8/1703* (2013.01); *B60T 8/172* (2013.01); *B64C 25/42* (2013.01); *B60T 2210/12* (2013.01)

(58) Field of Classification Search
CPC .... B60T 8/1703; B60T 8/172; B60T 2210/12; B64C 25/42
See application file for complete search history.

(56) References Cited

U.S. PATENT DOCUMENTS

| | | | |
|---|---|---|---|
| 6,850,185 B1* | 2/2005 | Woodell | G01S 13/93 342/29 |
| 7,014,146 B2 | 3/2006 | Villaume et al. | |
| 7,139,645 B2 | 11/2006 | Villaume et al. | |
| 7,340,327 B2 | 3/2008 | Villaume et al. | |
| 8,116,989 B2* | 2/2012 | Journade | G08G 5/0008 340/945 |
| 8,275,501 B2 | 9/2012 | Villaume | |
| 9,663,223 B1* | 5/2017 | Harrison | B64C 19/00 |
| 9,958,379 B1* | 5/2018 | Zhu | G01N 21/27 |
| 9,981,754 B2* | 5/2018 | Georgin | B64D 45/00 |
| 2003/0178501 A1 | 9/2003 | Doherty | |
| 2005/0006524 A1* | 1/2005 | Villaume | G05D 1/0083 244/111 |
| 2005/0167593 A1 | 8/2005 | Forsyth | |
| 2008/0215204 A1* | 9/2008 | Roy | G05D 1/0044 701/28 |
| 2009/0292433 A1* | 11/2009 | Goodman | B60T 8/1703 701/70 |
| 2009/0292483 A1* | 11/2009 | Journade | G08G 5/0008 702/33 |

(Continued)

FOREIGN PATENT DOCUMENTS

| | | |
|---|---|---|
| CN | 103287372 A | 9/2013 |
| EP | 2554443 A1 | 2/2013 |

*Primary Examiner* — Jeffrey C Boomer
(74) *Attorney, Agent, or Firm* — Jenkins, Wilson, Taylor & Hunt, P.A.

(57) ABSTRACT

Disclosed is an example for performing aircraft braking based on real time runway condition. In one example, during landing, real time data of runway condition may be obtained using at least one sensor disposed around an aircraft. At least one brake factor may be determined based on the real time data of the runway condition. Aircraft braking may be controlled based on the at least one brake factor.

17 Claims, 7 Drawing Sheets

(56) References Cited

U.S. PATENT DOCUMENTS

| | | | |
|---|---|---|---|
| 2011/0216196 A1* | 9/2011 | Ishi | H04N 7/18 |
| | | | 348/148 |
| 2012/0007979 A1* | 1/2012 | Schneider | G01J 3/36 |
| | | | 348/116 |
| 2013/0342683 A1* | 12/2013 | Nelson | G01J 3/0278 |
| | | | 348/135 |
| 2015/0120093 A1 | 4/2015 | Rennó | |
| 2015/0142217 A1* | 5/2015 | Metzger, Jr. | B60T 8/1763 |
| | | | 701/3 |
| 2015/0142388 A1* | 5/2015 | Metzger | B60T 8/1703 |
| | | | 702/189 |
| 2015/0179067 A1 | 6/2015 | Thun et al. | |
| 2015/0302753 A1* | 10/2015 | Henderson | G08G 5/02 |
| | | | 701/18 |
| 2016/0334276 A1* | 11/2016 | Pluvinage | G01J 3/2823 |

* cited by examiner

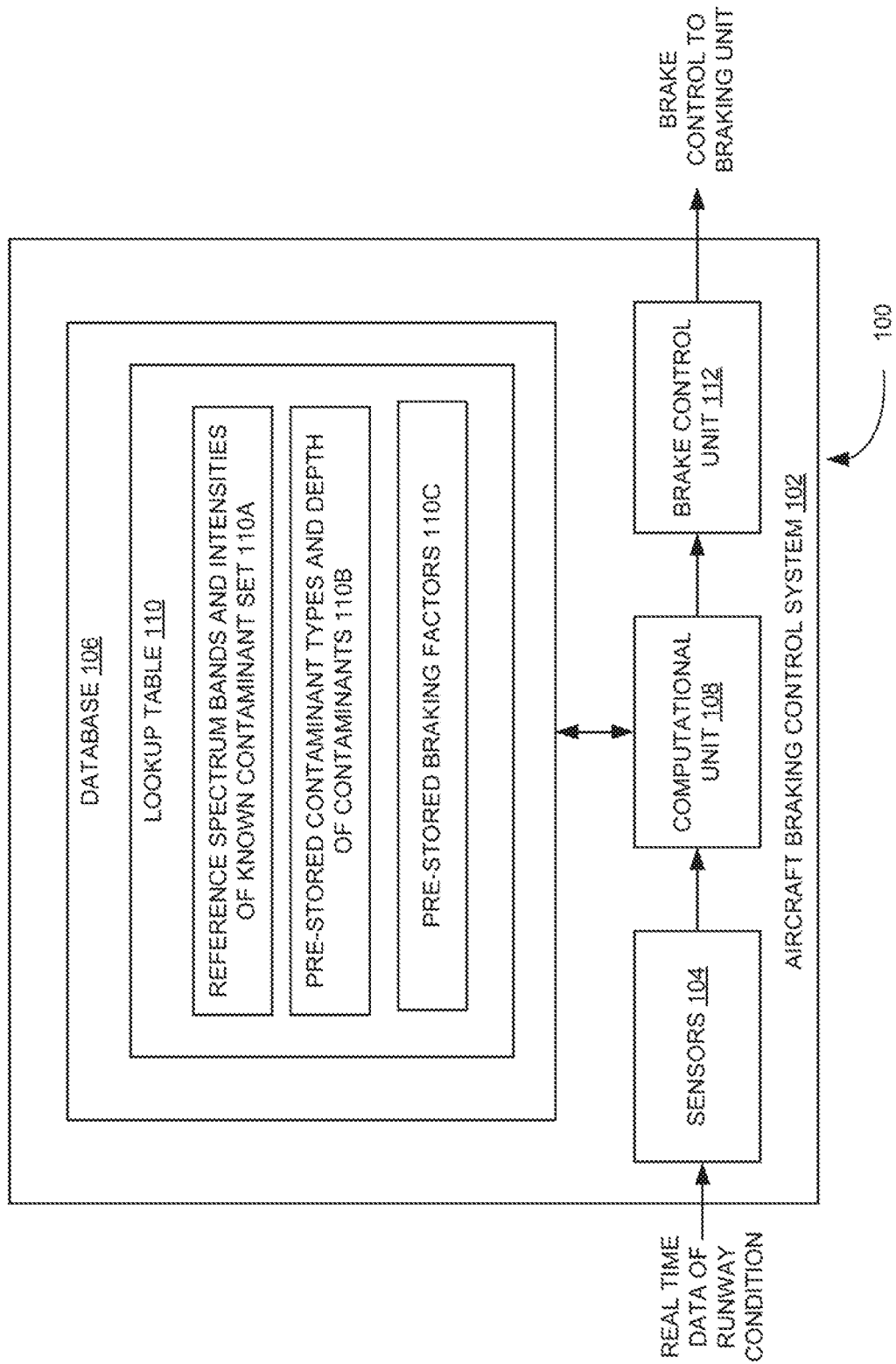

AIRCRAFT BRAKING BASED ON REAL TIME RUNWAY CONDITION

RELATED APPLICATIONS

Benefit is claimed under 35 U.S.C. 119(a)-(d) to Foreign Application Serial No. 6570/CHE/2015 filed in India entitled "AIRCRAFT BRAKING BASED ON REAL TIME RUNWAY CONDITION", on Dec. 8, 2015, by AIRBUS GROUP INDIA PRIVATE LIMITED, which is herein incorporated in its entirety by reference for all purposes.

TECHNICAL FIELD

Embodiments of the present subject matter generally relate to aircrafts, and more particularly, to aircraft braking based on real time runway condition.

BACKGROUND

Runways are commonly used for an aircraft to travel during takeoff and during landing. During landing runway conditions/braking assessment may be received from air traffic controllers for aircraft braking. Conditions that develop on runways ma vary with weather and other phenomenon. For example, conditions that develop on the runways may include, without limitation, snow, standing water, slush, ice, debris, indentations, and plant growth that extend onto the runway.

Conditions for a runway may be noted by pilots of aircraft that are using the runway or by equipment at airport/air traffic controllers or braking performance may be reported by the landing aircraft to an airport. The pilots or equipment operators may communicate the conditions for the runway to the air traffic controllers. Further, the air traffic controllers may inform other aircrafts of the conditions. In some cases, the runway conditions available with the air traffic controllers may be out-dated or irrelevant to the aircraft weight category (e.g., wheel tyre loading). For example, the braking assessment/runway condition data from the air traffic controllers to an aircraft may not be possible or accurate when the aircraft is the first flight of the day, when runway surface conditions have changed since last landing and/or when there is no air traffic controller process to check/relay this information to the aircraft. Also in some cases, there may be limited levels of braking which the pilot may have to manually input into the braking system via selector switch based on air traffic controller's estimate of the runway conditions. This may lead to a safe/conservative usage of braking which may be significantly below the optimum achievable braking and extend the braking distance. Hence time to exit the runway increases, constraining airport runway capacity.

SUMMARY

System and method for aircraft braking based on real time runway condition are disclosed. In one aspect, during landing, real time data of runway condition may be obtained using at least one sensor disposed around an aircraft. At least one brake factor may be determined based on the real time data of the runway condition. Aircraft braking may be dynamically controlled based on the at least one brake factor.

According to another aspect of the present subject matter, a system includes at least one sensor disposed around an aircraft, and a computational unit communicatively connected to the at least one sensor. In operation, the computational unit determines at least one brake factor based on the real time data of the runway condition. The system further includes a brake control unit to control aircraft braking based on the at least one brake factor.

According to another aspect of the present subject matter, a non-transitory computer-readable storage medium including instructions that are executed by a computational unit to perform the method described above.

The system and method disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein:

FIG. 1 illustrates a block diagram of an example onboard aircraft brake control system;

Figure 2A:
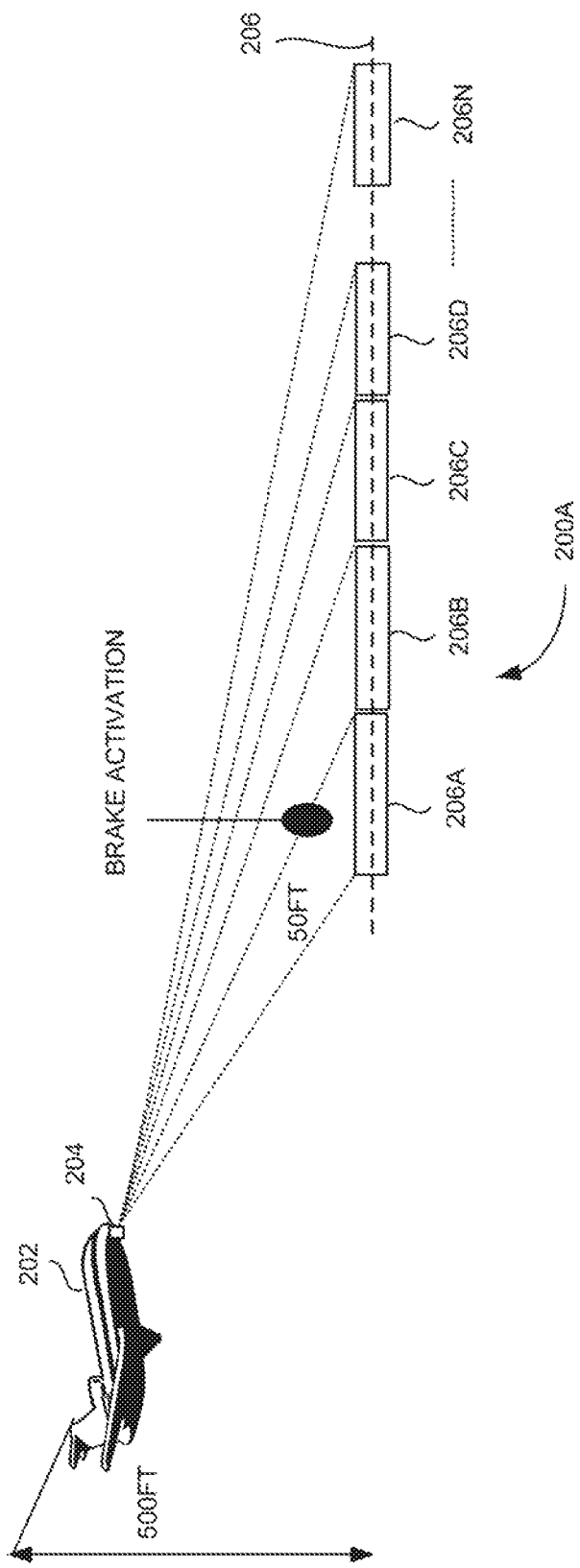
FIGS. 2A-2D illustrate example schematic diagrams for progressively determining brake factors for runway sub-regions based on real time runway condition.

The drawings described herein are for illustration purposes only and are not intended to limit the scope of the present disclosure in any way.

DETAILED DESCRIPTION

In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Embodiments described herein provide an aircraft braking based on real time runway condition. Example runway condition may be dry, wet, and/or contaminated. The term "dry runway" may refer to the runway which is clear of contaminants and visible moisture. The term "wet runway" may refer to the runway which is neither dry nor contaminated is considered wet. The term "contaminated runway" may refer to the runway which is covered by elements such as ice, slush, brine, gravel, debris (e.g., rubber debris of aircraft tyres), salt, oil, filet, rain water, dry/wet/compact snow, and/or a combination thereof. The runway condition may depend on a runway surface type, elements/composition of the contaminants on top of the runway, contaminants type, extent of coverage/area of the contaminants, and a thickness/depth of the contaminants present on the runway. Example runway surface type may be asphalt and/or concrete.

Depending on the runway condition, a safe reduction value may be applied to a brake factor. The terms "brake factor" and "friction factor" may be used interchangeably throughout the document. The brake factor may refer to an aircraft braking coefficient (μ) that is used to perform braking operations. The aircraft braking coefficient is dependent on a surface friction between aircraft wheels and the runway corresponding to the runway condition. Less friction means less aircraft braking coefficient and less aircraft braking response. For example, in case of the dry runway, the surface friction may be high and therefore a normal/high aircraft braking coefficient (e.g., μ of value 0.35-0.4 or above) may be applied for aircraft braking. For the wet/contaminated runway, the surface friction (i.e., grippability between aircraft wheels and the runway) may be low and therefore a reduction value may be applied to the normal aircraft braking coefficient (e.g., μ of value 0.25-0.3 or below). For example, the reduction value may be determined based on the runway condition.

Examples described herein provide an enhanced system, technique and a method for aircraft braking based on real time runway condition. In one example, real time data of runway condition may be obtained, during landing, using at least one sensor disposed around an aircraft. Further, at least one brake factor may be determined based on the real time data of the runway condition. Furthermore, aircraft braking may be dynamically controlled based on the at least one brake factor.

FIG. 1 illustrates a block diagram 100 of an example onboard-aircraft braking control system 102. The aircraft braking control system 102 can be disposed in an aircraft for controlling the aircraft braking. The aircraft braking control system 102 includes at least one sensor 104, a database 106, a computational unit 108, and a brake control unit 112. The sensor 104 may be disposed around the aircraft. Example sensor 104 may be an imaging device such as a hyperspectral camera and/or a multispectral camera. The camera may include a field-of-view within which the runway can be monitored. The computational unit 108 and the brake control unit 112 can be any combination of hardware and programming to implement the functionalities described herein. Example computational unit 108 and the brake control unit 112 can include a processor.

Further, the computational unit 108 may be communicatively connected to the sensor 104 and the database 106. The database 106 may store look-up table 110 associated with correlation data of spectrum of contaminants, pre-stored runway conditions 110B (e.g., contaminant types and depth of contaminants) associated with the runway and a set of pre-stored braking factors 110C corresponding to the pre-stored runway conditions. Each of the set of pre-stored brake factors 110C may correspond to different runway conditions. Example correlation data of spectrum of contaminants may include a set of reference spectral bands and intensities 110A corresponding to a known contaminant set. Example pre-stored runway conditions 110B may include a runway surface type, elements/composition of the contaminants on top of the runway, contaminants type, an extent of coverage/area of the contaminants, segment-wise distribution of contaminants on the runway, and depth of the contaminants present on the runway.

In operation, the sensor 104 may determine real time data of the runway condition during landing. In one example, an imaging device (i.e., sensor 104) may generate hyperspectral image data (i.e., real time data) including sensed spectral bands and intensities that correspond to the runway image within the field-of-view of the sensor 104. The imaging device may include built in visual/infrared/spectrometric filters for spectral scanning. Thereby, the hyperspectral image may include feature data such as spatial and hyperspectral information (e.g., spectral bands and associated intensities) in each pixel. This spatial and hyperspectral information may be used to identify the contaminants present on the runway surface, the area/surface of coverage/contamination, segment-wise distribution of contaminants on the runway, depth of contaminants on the runway, and the background (e.g., runway surface such as concrete/asphalt).

Further in operation, the computational unit 108 may obtain the real time data of runway condition from the sensor 104. Further, the computational unit 108 may determine at least one brake factor based on the real time data of the runway condition. In one example, the runway may be partitioned into multiple runway sub-regions. The terms "runway sub-region" and "runway segment" may be used interchangeably throughout the document. The runway sub-regions may be of any size, shape, length, width, and/or dimension without deviating from the scope of the present subject matter. Further, the runway condition associated with each runway sub-region within a field-of-view of the sensor 104 may be determined by analyzing the obtained real time data. The runway condition associated with each runway sub-region may progressively determined while the aircraft approaches each runway sub-region. This is explained in detail with respect to FIGS. 2A-2D.

In one example, the computational unit 108 determines the runway condition by extracting the feature data, such as spectral and spatial information, from the obtained real time hyperspectral image data. The computational unit 108 detects the presence of contaminants on each runway sub-region using the extracted feature data. In one example, the computational unit 108 may determine the contaminants on each runway sub-region by comparing the extracted feature data with the set of reference spectral bands and intensities corresponding to the known contaminant set. Further, the computational unit 108 may determine the depth of the contaminants contaminating the background (i.e., runway surface). Furthermore, the computational unit 108 generates a map of each runway sub-region with contaminant patches in the direction of motion of the aircraft based on the determined contaminants and the depth of the contaminants on the runway. In addition, the computational unit 108 may determine the contaminated patches (i.e., runway condition) corresponding to each runway sub-region which is likely to be encountered in line of undercarriage/wheels of the aircraft using the generated map.

For example, the runway sub-region/segment condition is determined as "contaminated patches" with standing water patch of 6 mm depth extending as layer-1, compact ice of 3 mm depth as layer-2 below the layer-1, slush and rubber debris extending for 20 feet on a concrete runway surface.

Furthermore in operation, the computational unit 108 may determine the brake factors associated with each runway sub-region based on the corresponding runway conditions (i.e., contaminated patches in line of the undercarriage/wheels of the aircraft). In one example, the computational unit 108 may compare/correlate the determined contaminated patches in line of the undercarriage/wheels of the aircraft with pre-stored runway conditions in the look-up table 110. The computational unit 108 may determine brake factors corresponding to each runway sub-region from the set of pre-stored brake factors based on the real time comparison/correlation. In one example, a brake factor corresponding to a runway sub-region is determined when the determined runway condition associated with the runway sub-region substantially matches with the pre-stored runway condition in the look-up table 110. The set of pre-stored brake factors may correspond to different runway conditions and augmented based on database updation associated with the runway condition.

FIGS. 2A-2D illustrate example schematic diagrams for progressively determining brake factors for runway sub-regions based on real time runway condition. FIGS. 2A-2D show an aircraft 202 and a sensor 204 disposed at nose of the aircraft 202. In other example, the sensor 204 may also be disposed in front of cockpit, tail tip of the aircraft 202 and/or the like. Further, FIGS. 2A-2D show a runway 206 partitioned into multiple runway sub-regions 206A-N. In other words, each runway sub-region can be progressively identified within field-of-view "θ" of the sensor 204 while the aircraft 202 approaches toward the runway 206 for landing.

Figure 2B:
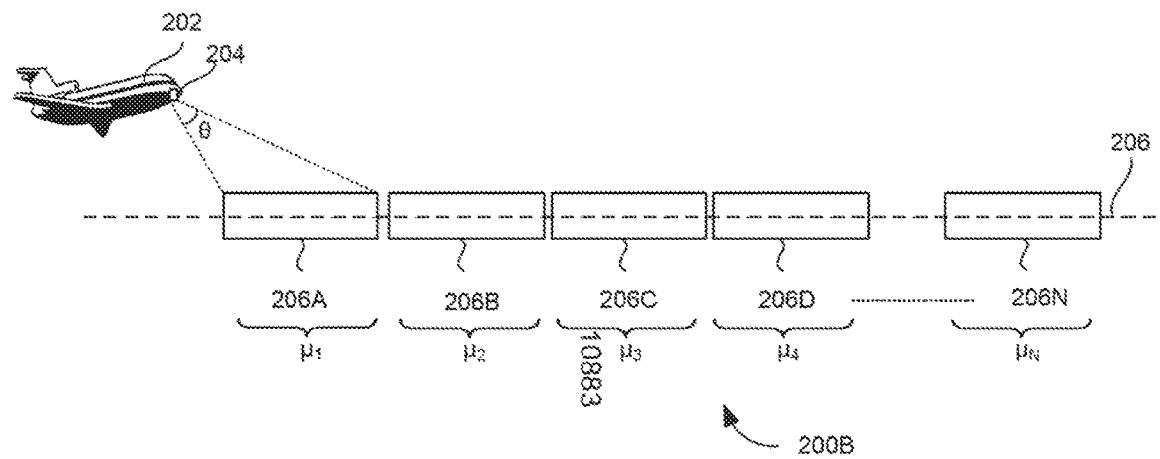

As shown in FIG. 2B, the real time hyperspectral image of the runway sub-region 206A within the field-of-view "θ" of the sensor 204 may be generated when the aircraft 202 approaches toward (i.e., before approaching the runway) the runway 206. The contaminated patches (i.e., runway condition) associated with the runway sub-region 206A may be determined by analyzing the real time hyperspectral image of the runway sub-region 206A. Further, a brake factor $\mu_1$ associated with the runway sub-region 206A may be determined based on the contaminated patches present on the top of the runway sub-region 206A using the process explained in FIG. 1. Furthermore, the brake factor $\mu_1$ and associated runway condition may be updated to the database 106 or fed to the brake control unit 112 (as shown in FIG. 1).

Figure 2C:
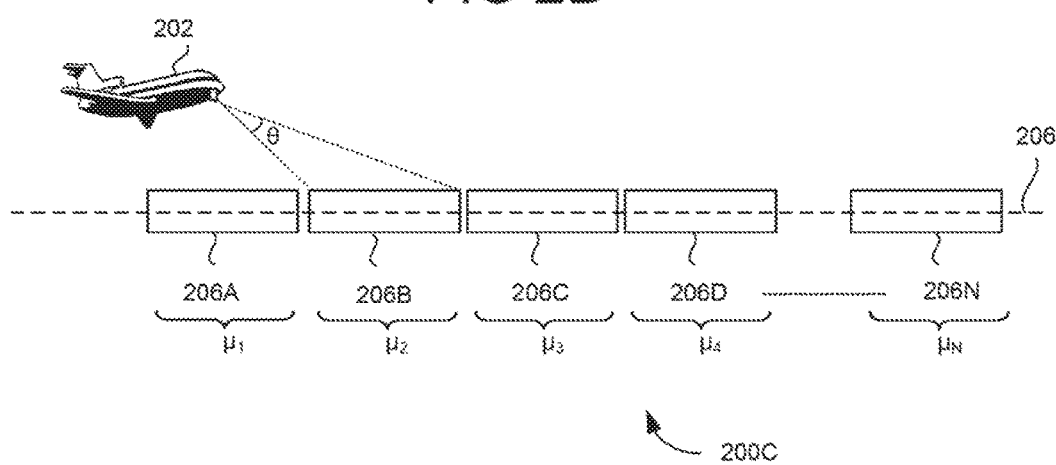
Figure 2D:
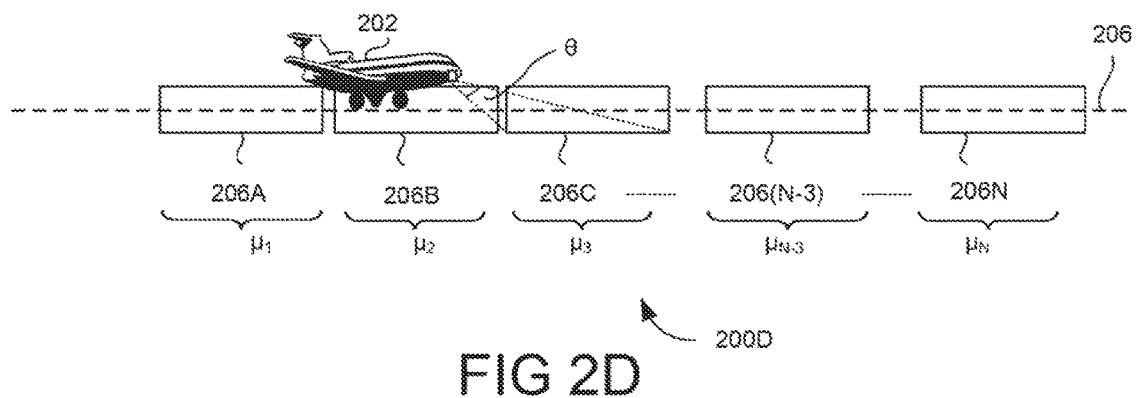
Figure 3:
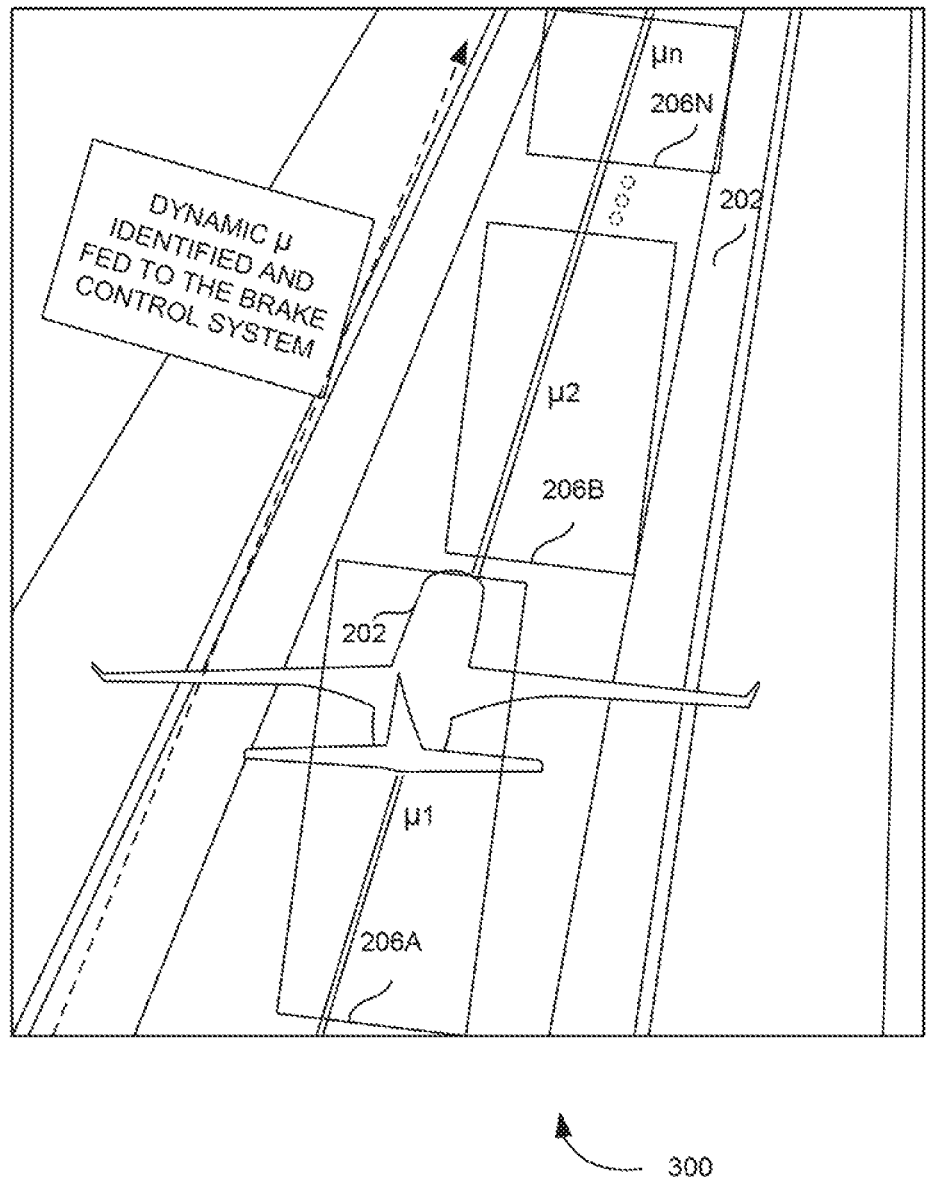
FIG. 3 illustrates a top view of an example schematic diagram showing the runway sub-regions.

As shown in FIG. 2C, when the aircraft 202 enters the runway sub-region 206A, the brake factor $\mu_1$ may be fed to the brake control unit 112, for example, via a transmission medium (e.g., wired or wireless transmission). At the same time, the sensor 204 may cover the runway sub-region 206B, accordingly contaminated patches (i.e., runway condition) associated with the runway sub-region 206B may be determined. Further, the brake factor $\mu_2$ associated with the runway sub-region 206B may be determined based on the contaminated patches present on the top of the runway sub-region 206B. As aforementioned, the brake factor $\mu_2$ and associated runway condition may be dynamically updated to the database 106.

As shown in FIG. 2A, consider automatic/manual brake activation is made in the runway sub-region 206A, so that the aircraft brake may be applied when the aircraft 202 rolls-down at runway sub-region 206B. In example shown in FIG. 2D, when the aircraft 202 crosses from the runway sub-region 206A and enters the runway sub-region 206B, the brake factor $\mu_2$ corresponding to the runway sub-region 206B may be fed to the brake control unit 112. Thereby, the aircraft braking for the aircraft 202 traversing in the runway sub-region 206B may be dynamically controlled based on the brake factor $\mu_2$. Similarly, the braking factor for each runway sub-region is dynamically determined and inputted to the braking control unit 112 till the aircraft 202 comes to haft or the landing operation is completed.

The brake control unit 112 may be communicatively coupled to the database 106 and the computational unit 108. In operation, the brake control unit 112 may control aircraft braking based on the brake factors corresponding to each runway sub region. In one example, the brake control unit 112 may control aircraft braking using the brake factors associated with each runway sub-region when the aircraft encounters a corresponding runway sub-region upon touchdown of the aircraft.

In one example, during landing phase, the braking parameters associated with the brake factors may be provided as input automatically to the braking unit (not shown in FIG. 1). Yet in another example, the braking parameters may be provided as input to the braking unit upon validation from the pilot.

Further, the determined brake factors may be relayed through a transmission medium to the aircraft brake control unit 112 or an on-board aircraft system (e.g., braking distance computer/brake-to-vacate (BTV), runway-overrun protection system (ROPS), on-board airport navigation system (OANS), and airborne/ground-air/satellite-air). For example, the on-board aircraft system may calculate a braking performance of the aircraft 202 with respect to the landing runway 206 and automatically factors in differences in performance over different runway sub-regions 206A-N to extract maximum braking efficiency that corresponds to a real-time runway condition. In another example, the OANS system may automatically suggest the optimal exit point with the allowable optimum speed based on the relayed data. Thereby, the taxiing distance, time-to-vacate, and fuel consumption of the landing aircraft may be minimized.

Autonomously, the system 100 may provide the real-time runway condition assessment for the aircraft-on-approach without involving manual entry, selection procedures, and chart updates.

Figure 4:
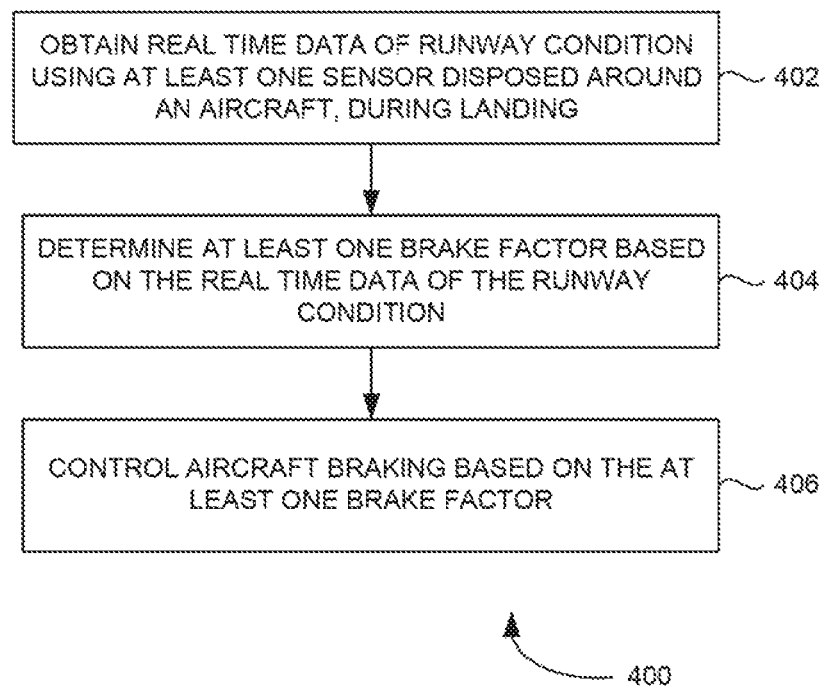
FIG. 4 illustrates an example flow diagram for aircraft braking based on real time runway condition.

FIG. 4 illustrates the flow diagram 400 for aircraft braking based on real time data of runway condition. At block 402, real time data of runway condition may be obtained using at least one sensor disposed around an aircraft, during landing. In one example, the real time data may be hyperspectral image data. The hyperspectral image data may include spectral bands and intensities that correspond to the full image (i.e., runway image) in the field-of-view of the sensor.

At block 404, at least one brake factor may be determined based on the real time data of the runway condition. The brake factor may include an aircraft braking coefficient that depends on a surface friction (i.e., grippability) between aircraft wheels and the runway. In one example, the runway may be partitioned into multiple runway sub-regions. Further, the runway condition (i.e., contaminated patches in line of the undercarriage/wheels of the aircraft) associated with each runway sub-region within a field-of-view of the sensor may be determined by analyzing the obtained hyperspectral image data. The brake factors associated with each runway sub-region may be determined based on the determined runway condition. Furthermore, the runway condition associated with each runway sub-region may be progressively determined while the aircraft approaches each runway sub-region.

At block 406, aircraft braking may be controlled based on the at least one brake factor. In one example, the aircraft braking may be controlled by using the brake factors associated with each runway sub-region when the aircraft encounters a corresponding runway sub-region upon touchdown of the aircraft. This is explained in more detail in FIG. 5.

Figure 5:
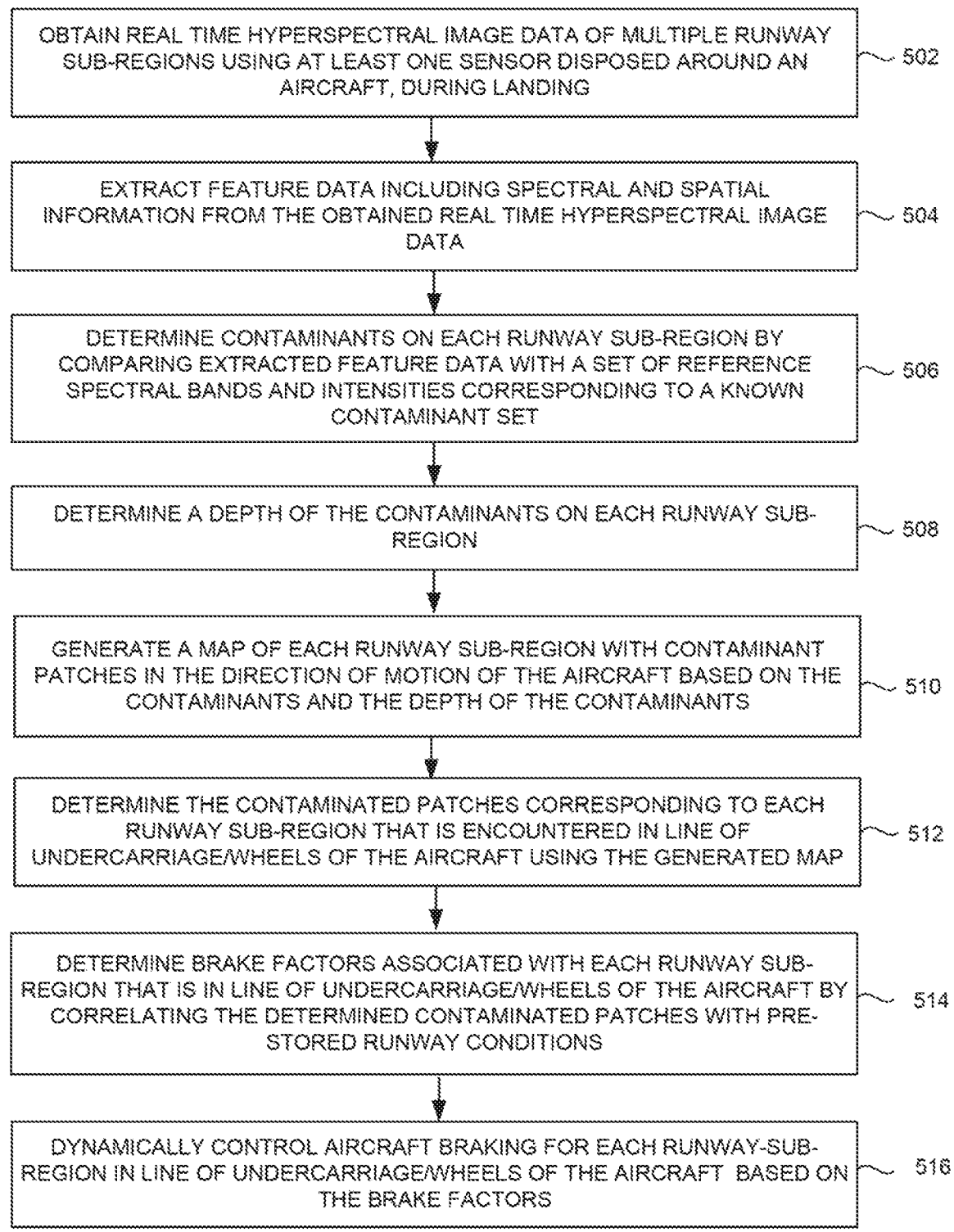
FIG. 5 illustrates an example flow diagram for aircraft braking based on real time hyperspectral image data of runway.

FIG. 5 illustrates the flow diagram 500 for aircraft braking based on real time hyperspectral image data of runway. At block 502, real time hyperspectral image data of multiple runway sub-regions may be obtained using at least one sensor disposed around an aircraft, during landing. At block 504, feature data including spectral and spatial information may be extracted from the obtained real time hyperspectral image data. At block 506, contaminants on each runway sub-region may be determined by comparing extracted feature data with a set of reference spectral bands and intensities corresponding to a known contaminant set.

At block 508, depth of the contaminants on each runway sub-region may be determined. At block 510, a map of each runway sub-region with contaminant patches in the direction of motion of the aircraft may be generated based on the contaminants and the depth of the contaminants. At block 512, the contaminated patches corresponding to each runway sub-region which is encountered in line of undercarriage/wheels of the aircraft may be determined using the generated map.

At block 514, brake factors associated with each runway sub-region that is in line of undercarriage/wheels of the aircraft may be determined by correlating the determined contaminated patches in line of undercarriage/wheels of the aircraft with pre-stored runway conditions. In one example, brake factors corresponding to each runway sub-region may be determined from a set of pre-stored brake factors when the determined contaminated patches matches with a pre-stored runway condition. The set of pre-stored brake factors correspond to different runway conditions. At block 516, aircraft braking in line of undercarriage/wheels of the aircraft may be dynamically controlled based on the determined brake factors.

Figure 6:
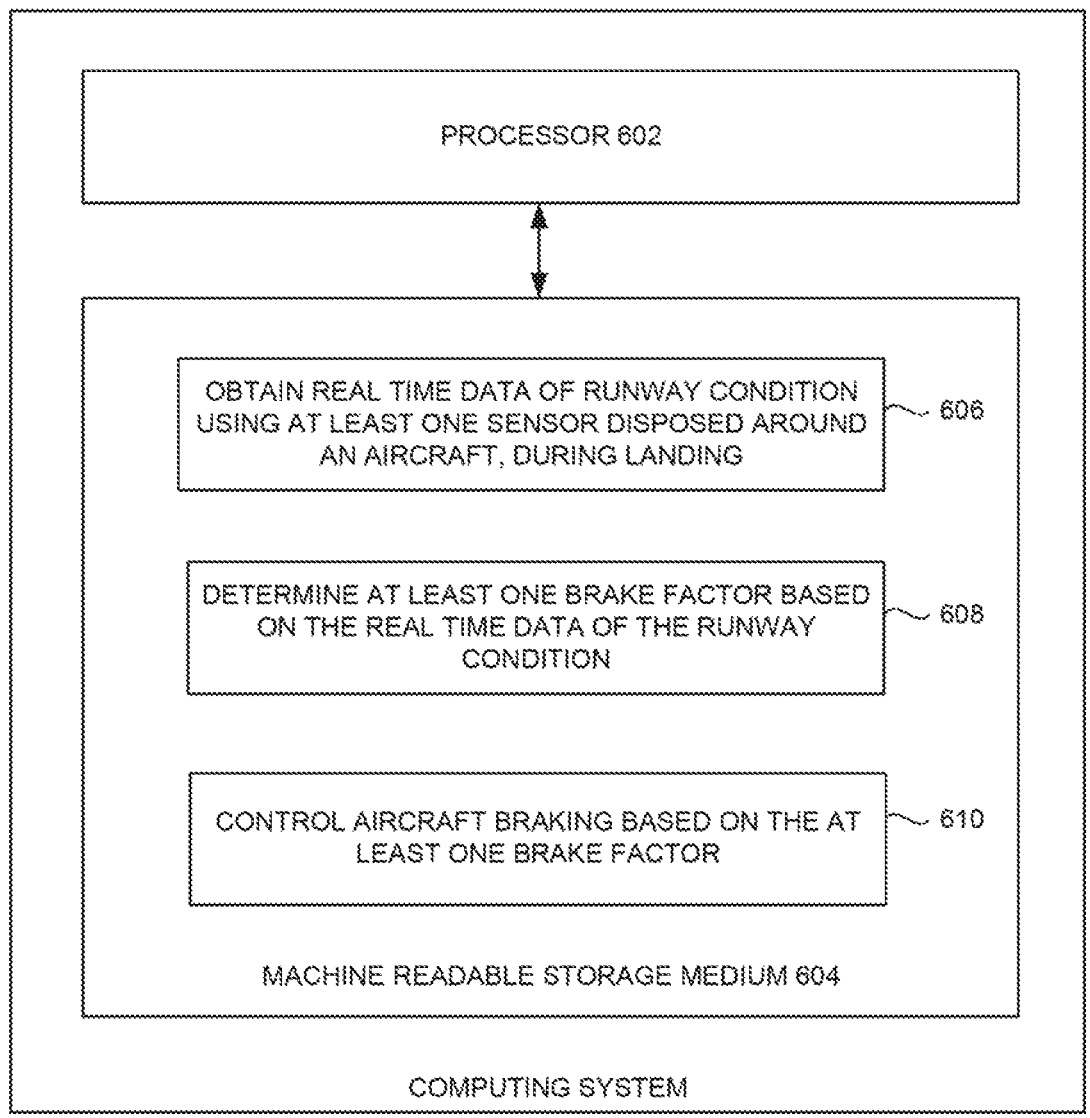
FIG. 6 illustrates an example block diagram of a computing system for aircraft braking based on real time runway condition.

FIG. 6 illustrates a block diagram of an example computing system 600 for controlling aircraft braking based on real time runway condition. The computing system 600 includes a processor 602 and a machine-readable storage medium 604 communicatively coupled through a system bus. The processor 602 may be any type of central processing unit (CPU), microprocessor, or processing logic that interprets and executes machine-readable instructions stored in the machine-readable storage medium 604. The machine-readable storage medium 604 may be a random access memory (RAM) or another type of dynamic storage device that may store information and machine-readable instructions that may be executed by the processor 602. For example, the machine-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 604 may be a non-transitory machine-readable medium. In an example, the machine-readable storage medium 604 may be remote but accessible to the computing system 600.

The machine-readable storage medium 604 may store instructions 606-610. In an example, instructions 606-610 may be executed by the processor 602 for performing aircraft braking based on real time data of runway condition.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof as used herein, have the same meaning as the term "comprise" or appropriate variation thereof. Furthermore, the term "based on", as used herein, means "based at least in part on."

The present description has been shown and described with reference to the foregoing examples. It is understood, however, that other forms, details, and examples can be made without departing from the spirit and scope of the present subject matter that is defined in the following claims.

What is claimed is:

1. A method comprising:
   obtaining real time data of runway condition of a runway from at least one sensor disposed on an aircraft, during landing;
   determining at least one brake factor based on the real time data of the runway condition, wherein determining the at least one brake factor based on the obtained real time data of the runway condition, comprises:
   partitioning the runway into multiple runway sub-regions such that each runway sub-region corresponds to a field-of-view of the at least one sensor while the aircraft approaches the runway for landing;
   determining the runway condition associated with each runway sub-region within the field-of-view of the at least one sensor by analyzing the real time data, wherein the real time data is hyperspectral image data, and wherein determining the runway condition associated with each runway sub-region by analyzing the hyperspectral image data, comprises:
   extracting feature data from the hyperspectral image data associated with each runway sub-region, wherein the feature data comprises spectral and spatial information;
   detecting a presence of at least one contaminant on each runway sub-region using the extracted spectral and spatial information, wherein detecting the presence of the at least one contaminant on each runway sub-region using the extracted spectral and spatial information, comprises:
   determining contaminants on each runway sub-region by comparing the extracted feature data with a set of reference spectral bands and intensities corresponding to a predetermined contaminant set in a look-up table;
determining depth of the contaminants on each runway sub-region;
generating a map of each runway sub-region with contaminant patches in the direction of motion of the aircraft based on the contaminants and the depth of the contaminants; and
determining the contaminated patches corresponding to each runway sub-region that is likely to be encountered with undercarriage/wheels of the aircraft using the generated map; and
determining the runway condition associated with each runway sub-region based on the detected at least one contaminant; and
determining brake factors associated with each runway sub-region based on the determined runway condition; and
dynamically controlling aircraft braking based on the at least one brake factor.

2. The method of claim 1, wherein determining the brake factors associated with each runway sub-region based on the determined runway condition, comprises:
correlating the determined contaminated patches corresponding to each runway sub-region with pre-stored runway conditions in the look-up table; and
determining the brake factors corresponding to each runway sub-region that is likely to be encountered with the undercarriage/wheels of the aircraft from a set of pre-stored brake factors based on the correlation, wherein the set of pre-stored brake factors correspond to different runway conditions.

3. The method of claim 2, wherein controlling the aircraft braking based on the at least one brake factor, comprises:
controlling the aircraft braking using the brake factors associated with each runway sub-region when the aircraft encounters a corresponding runway sub-region upon touch-down of the aircraft.

4. The method of claim 1, wherein the at least one brake factor comprises an aircraft braking coefficient that depends on a surface friction between aircraft wheels and the runway.

5. The method of claim 1, wherein the runway condition comprises at least one of a runway surface type, elements/composition of contaminants on top of the runway, an extent of coverage/area of contaminants, segment-wise distribution of contaminants on the runway, and depth of contaminants present on the runway.

6. The method of claim 1, wherein the hyperspectral image data includes sensed spectral bands and intensities that correspond to a runway image within the field-of-view of the at least one sensor and wherein the at least one sensor comprises of a hyperspectral camera.

7. The method of claim 1, wherein determining the runway condition associated with each runway sub-region within the field-of-view of the at least one sensor, comprises:
progressively determining the runway condition associated with each runway sub-region while the aircraft approaches each runway sub-region.

8. An onboard-aircraft braking control system comprising:
at least one sensor disposed on an aircraft to determine real time data of runway condition of a runway during landing;
a computational unit communicatively coupled to the at least one sensor, the computational unit is configured to:
receive the real time data of the runway condition of the runway from the at least one sensor; and
determine at least one brake factor based on the obtained real time data of the runway condition, wherein the computational unit determines the at least one brake factor based on the obtained real time data of the runway condition, by:
partitioning the runway into multiple runway sub-regions such that each runway sub-region corresponds to a field-of-view of the at least one sensor while the aircraft approaches the runway for landing;
determining the runway condition associated with each runway sub-region within the field-of-view of the at least one sensor by analyzing the obtained real time data, wherein the real time data is hyperspectral image data, wherein the computational unit determines the runway condition associated with each runway sub-region by analyzing the hyperspectral image data, by:
extracting feature data from the hyperspectral image data associated with each runway sub-region, wherein the feature data comprises spectral and spatial information;
detecting a presence of at least one contaminant on each runway sub-region using the extracted spectral and spatial information, wherein the computational unit detects the presence of the at least one contaminant on each runway sub-region using the extracted spectral and spatial information, by:
determining contaminants on each runway sub-region by comparing extracted feature data with a set of reference spectral bands and intensities corresponding to a predetermined contaminant set in a look-up table;
determining depth of the contaminants on each runway sub-region;
generating a map of each runway sub-region with contaminant patches in the direction of motion of the aircraft based on the contaminants and the depth of the contaminants; and
determining the contaminated patches corresponding to each runway sub-region that is likely to be encountered with undercarriage/wheels of the aircraft using the generated map; and
determining the runway condition associated with each runway sub-region based on the detected at least one contaminant; and
determining the brake factors associated with each runway sub-region based on the determined runway condition; and
a brake control unit to control aircraft braking based on the at least one brake factor.

9. The system of claim 8, wherein the computational unit determines the brake factors associated with each runway sub-region based on the determined runway condition, by:
correlating the determined contaminated patches corresponding to each runway sub-region with pre-stored runway conditions in the look-up table; and
determining the brake factors corresponding to each runway sub-region that is likely to be encountered with the undercarriage/wheels of the aircraft from a set of pre-stored brake factors based on the correlation, wherein the set of pre-stored brake factors correspond to different runway conditions.

10. The system of claim 9, wherein the braking control unit controls the aircraft braking based on the at least one brake factor, by:
controlling aircraft braking using the brake factors associated with each runway sub-region when the aircraft encounters a corresponding runway sub-region upon touch-down of the aircraft.

11. The system of claim 8, comprising a database to store the look-up table associated with at least one of correlation data of spectrum of contaminants, pre-stored runway conditions associated with the runway, and a set of pre-stored brake factors corresponding to the pre-stored runway conditions, wherein the correlation data include k set of reference spectral bands and intensities corresponding to the predetermined contaminant set.

12. The system of claim 8, wherein the hyperspectral image data includes sensed spectral bands and intensities to correspond to a runway image within the field-of-view of the at least one sensor, and wherein the at least one sensor is a hyperspectral camera.

13. The system of claim 8, wherein the computational unit determines the runway condition associated with each runway sub-region within the field-of-view of the at least one sensor, by:
progressively determining the runway condition associated with each runway sub-region while the aircraft approaches each runway sub-region.

14. A non-transitory computer-readable storage medium including instructions that are executed by a computational unit to:
receive real time data of runway condition of a runway from at least one sensor disposed on an aircraft, during landing;
determine at least one brake factor based on the obtained real time data of the runway condition, wherein determining the at least one brake factor based on the obtained real time data of the runway condition, comprises:
partitioning the runway into multiple runway sub-regions such that each runway sub-region corresponds to a field-of-view of the at least one sensor while the aircraft approaches the runway for landing;
determining the runway condition associated with each runway sub-region within the field-of-view of the at least one sensor by analyzing the real time data, wherein the real time data is hyperspectral image data, wherein determining the runway condition associated with each runway sub-region by analyzing the real time data, comprises:
extracting feature data from the real time data associated with each runway sub-region, wherein the feature data comprises spectral and spatial information;
detecting a presence of at least one contaminant on each runway sub-region using the extracted spectral and spatial information, wherein detecting the presence of the at least one contaminant on each runway sub-region using the extracted spectral and spatial information, comprises:
determining contaminants on each runway sub-region by correlating extracted feature data with a set of reference spectral bands and intensities corresponding to a predetermined contaminant set in a look-up table;
determining depth of the contaminants on each runway sub-region;
generating a map of each runway sub-region with contaminant patches in the direction of motion of the aircraft based on the contaminants and the depth of the contaminants; and
determining the contaminated patches corresponding to each runway sub-region that is likely to be encountered with undercarriage/wheels of the aircraft using the generated map; and
determining the runway condition associated with each runway sub-region based on the detected at least one contaminant; and
determining brake factors associated with each runway sub-region based on the determined runway condition; and
control aircraft braking based on the at least one brake factor.

15. The non-transitory computer-readable storage medium of claim 14, wherein determining the brake factors associated with each runway sub-region based on the determined runway condition, comprises:
correlating the determined contaminated patches corresponding to each runway sub-region with pre-stored runway conditions in the look-up table; and
determining the brake factors corresponding to each runway sub-region that is likely to be encountered with the undercarriage/wheels of the aircraft from a set of pre-stored brake factors based on the correlation, wherein the set of pre-stored brake factors correspond to different runway conditions.

16. The non-transitory computer-readable storage medium of claim 14, wherein the hyperspectral image data includes sensed spectral bands and intensities to correspond to a runway image within the field-of-view of the at least one sensor, and wherein the at least one sensor comprises of a hyperspectral camera.

17. The non-transitory computer-readable storage medium of claim 14, wherein determining the runway condition associated with each runway sub-region within the field-of-view of the at least one sensor, comprises:
progressively determining the runway condition associated with each runway sub-region while the aircraft approaches each runway sub-region.

* * * * *